US011222023B2

(12) United States Patent
Narula et al.

(10) Patent No.: US 11,222,023 B2
(45) Date of Patent: Jan. 11, 2022

(54) VIRTUAL WIDGET CONTAINER

(71) Applicant: BUSINESS OBJECTS SOFTWARE LTD., Dublin (IE)

(72) Inventors: Sanam Narula, Vancouver (CA); Noel Ray Barron, Vancouver (CA); Pak Man Chan, Vancouver (CA); Walter Mak, North Vancouver (CA); Rita Huang, Vancouver (CA); Tsz Hong Sung, Richmond (CA)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 86 days.

(21) Appl. No.: 16/559,838

(22) Filed: Sep. 4, 2019

(65) Prior Publication Data
US 2021/0064623 A1 Mar. 4, 2021

(51) Int. Cl.
*G06F 16/2455* (2019.01)
*G06F 16/954* (2019.01)
*H04L 29/06* (2006.01)
*G06F 3/0481* (2013.01)
*G06F 3/0484* (2013.01)
*G06F 16/958* (2019.01)

(52) U.S. Cl.
CPC ...... *G06F 16/24562* (2019.01); *G06F 3/0484* (2013.01); *G06F 3/04815* (2013.01); *G06F 16/954* (2019.01); *G06F 16/958* (2019.01); *H04L 67/42* (2013.01)

(58) Field of Classification Search
None
See application file for complete search history.

(56) References Cited

U.S. PATENT DOCUMENTS

| | | | |
|---|---|---|---|
| 10,789,262 B2* | 9/2020 | Sekharan | G06F 3/14 |
| 2012/0323992 A1* | 12/2012 | Brobst | G01C 21/3694 709/203 |
| 2013/0055072 A1* | 2/2013 | Arnold | G06T 15/005 715/240 |
| 2013/0342561 A1* | 12/2013 | Cardno | G06T 11/001 345/592 |
| 2017/0076471 A1* | 3/2017 | Prophete | G06T 13/80 |
| 2017/0357679 A1* | 12/2017 | Kumar | G06F 16/22 |
| 2018/0173754 A1* | 6/2018 | Kumar | G06F 16/24535 |
| 2018/0293154 A1* | 10/2018 | Giat | G06F 9/48 |
| 2018/0314745 A1* | 11/2018 | Filippi | G06F 16/2455 |
| 2018/0336214 A1* | 11/2018 | Kumar | G06F 16/248 |
| 2018/0341388 A1* | 11/2018 | Zheng | G06F 9/451 |
| 2020/0225838 A1* | 7/2020 | Li | G06F 16/26 |
| 2020/0327167 A1* | 10/2020 | Smith | G06F 16/9024 |

\* cited by examiner

*Primary Examiner* — Howard Cortes
(74) *Attorney, Agent, or Firm* — Buckley, Maschoff & Talwalkar LLC

(57) ABSTRACT

A system includes reception of a request to execute queries associated with an interactive data visualization, building, based on the request, of all queries required by the interactive data visualization on a background thread, reception of a query response associated with each built query on the background thread, building of a final response on the background thread based on the received query responses, and rendering, on a main thread, of the interactive data visualization based on the final response.

19 Claims, 8 Drawing Sheets

VIRTUAL WIDGET CONTAINER

BACKGROUND

According to conventional data visualization, a client computing system requests data from a server computing system. The request may specify measures and dimensions, filters and a type of data visualization. The server computing system returns information to the client computing system, using which the client system displays the data in a format corresponding to the visualization type (e.g., a bar chart).

Some systems allow encapsulation of visualizations within interactive entities which will be referred to herein as widgets. A widget may include information about any defined data values in the form of an interactive visualization. Multiple widgets may be combined into a "story" in order to provide insight into a particular scenario. The processing resources required for satisfactory client performance increase significantly as the number of widgets within a story increases. This issue is felt particularly strongly in limited-resource systems such as mobile devices.

In conventional mobile device operation, all widgets of a story are received and each widget is loaded one at a time in one mobile rendering object (e.g., a WKWebView object in iOS). Two mobile rendering objects may be executed to execute required queries and render widgets in parallel but this approach strains processing resources and only provides dual parallelism.

DETAILED DESCRIPTION

The following description is provided to enable any person in the art to make and use the described embodiments. Various modifications, however, will remain readily-apparent to those in the art.

Generally, some embodiments acquire all data needed to render a widget on a background thread (even if multiple backend queries are required) and then render the widget using a rendering object executing on a main thread. Such embodiments therefore allow acquisition of the data even if a main thread rendering object is busy. Moreover, embodiments provide increased efficiency because the rendering object is not required to first build and fire a query to check a result cache for the required data. Some embodiments also avoid a situation in which a partial query response is received and the rendering object is required to create and fire additional queries to the backend to retrieve additional data.

Embodiments may improve performance by offloading substantial work from the main thread and supporting parallel processing. Embodiments may also conserve memory usage by preparing widget metadata without the use of loading memory-intensive rendering code.

Figure 1:
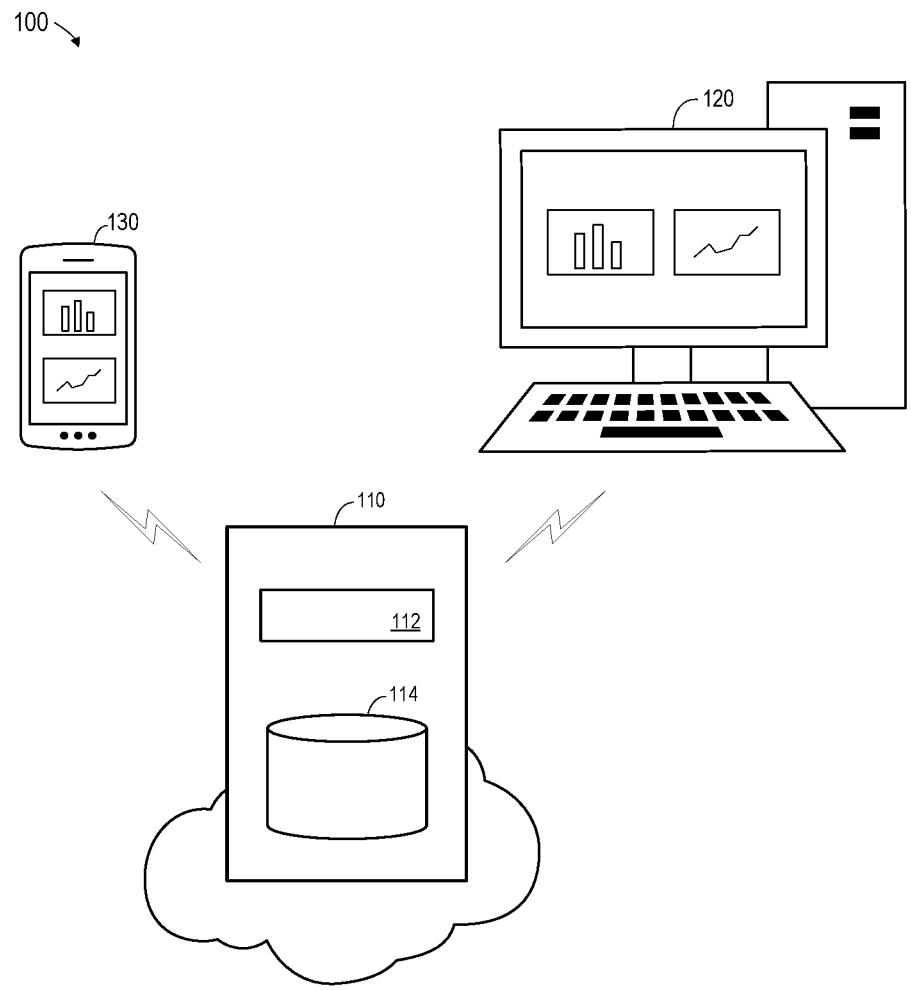
FIG. 1 is a block diagram of a system according to some embodiments.

FIG. 1 is a block diagram of system 100 according to some embodiments.

Embodiments are not limited to the FIG. 1 system. Server 110 may execute server application 112 to provide visualizations of data stored in data store 114 according to some embodiments. Server 110 may receive requests from client devices 120 and 130 and provide the data visualizations thereto in response. The data visualizations may be provided in a format which may be rendered by applications executed by client devices 120 and 130.

According to some embodiments, client device 120 executes a Web browser to present a user interface to a user on a display of client device 120. The user enters a query into the user interface, and client device 120 passes a request based on the query to server 110. Server application 112 generates an SQL script based on the request, and forwards the SQL script to a database engine of server 110 to execute the SQL script and return a result set to server application 112 based on data of data store 114. Server application 112 generates a data visualization based on the result set, and client device 120 renders and displays the data visualization by executing client code in an execution environment of the Web browser. FIG. 1 illustrates a data visualization including two widgets.

Mobile device 130 may also execute client code to render and display the two widgets. Due to the smaller screen size, and based on the rendering information of the widgets, the client code of mobile device 130 places the two widgets differently than shown on client device 120. Mobile 130 may execute a mobile operating system on which client code of server application 112 executes. The client code may differ from the client code executed by client device 120.

Data store 114 may comprise any data sources which are or become known, including but not limited to database views, spreadsheets, relational databases and/or OnLine Analytical Processing cubes. Data store 114 may also comprise any query-responsive data source or sources that are or become known, including but not limited to a structured-query language (SQL) relational database management system. The data of data store 114 may be distributed among several relational databases, dimensional databases, and/or other data sources. Embodiments are not limited to any number or types of data sources.

In some embodiments, the data of data store 114 may comprise one or more of conventional tabular data, row-based data, column-based data, and object-based data. Moreover, the data may be indexed and/or selectively replicated in an index to allow fast searching and retrieval thereof. Data store 114 may support multi-tenancy to separately support multiple unrelated clients by providing multiple logical database systems which are programmatically isolated from one another.

Data store 114 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 2:
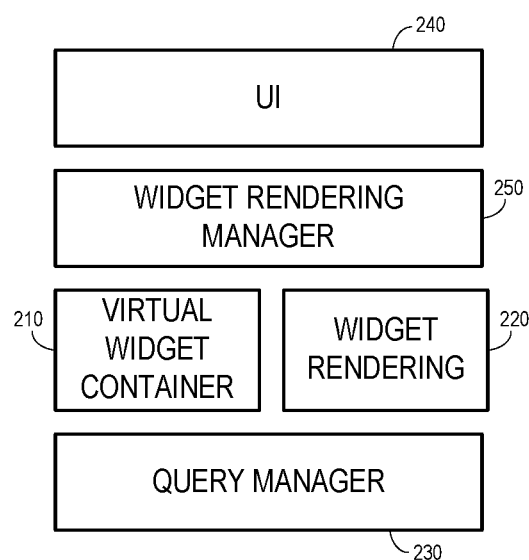
FIG. 2 is a block diagram of a software components of a mobile device according to some embodiments.

FIG. 2 illustrates components of a software stack of a client device for rendering widgets according to some embodiments. The client device may comprise a smartphone, tablet computer, laptop computer or any other device that is or becomes known. Some embodiments may be suitable for devices with limited processing and/or memory resources.

Virtual widget container 210 comprises an environment which executes on a background thread and operates on widget entities. Virtual widget container 210 interprets widget metadata, prepares required queries and fires the queries to the backend. Once all the result set data is acquired, the result set data is passed to widget rendering component 220 to render the widget on the main thread.

According to some embodiments, virtual widget container 210 comprises a headless environment of JavaScript which can be executed by a background thread. A server-served widget typically conforms to a client user interface technology (e.g., UI5). Some client user interface technologies provide the ability to automatically adapt UI controls to the capabilities of the client device. A widget is defined by metadata which is interpretable by a client application supporting the client UI technology. However, such a client application typically runs on the main thread and is memory-intensive.

Widget metadata includes metadata information, filter information, and data information. In order to interpret widget metadata, build queries and fetch data on the background thread, virtual widget container 210 removes dependencies of the client UI technology. Virtual widget container 210 nonetheless supports the bindings, properties and behaviors of the client UI technology which allow virtual widget container 210 to use widget source code to control widget lifecycle, perform data preparations, and fetch data. Moreover, as will be described below, virtual widget container 210 includes logic to ensure that all the queries needed for rendering a widget are completed before the data is passed to the main thread for rendering.

Figure 3:
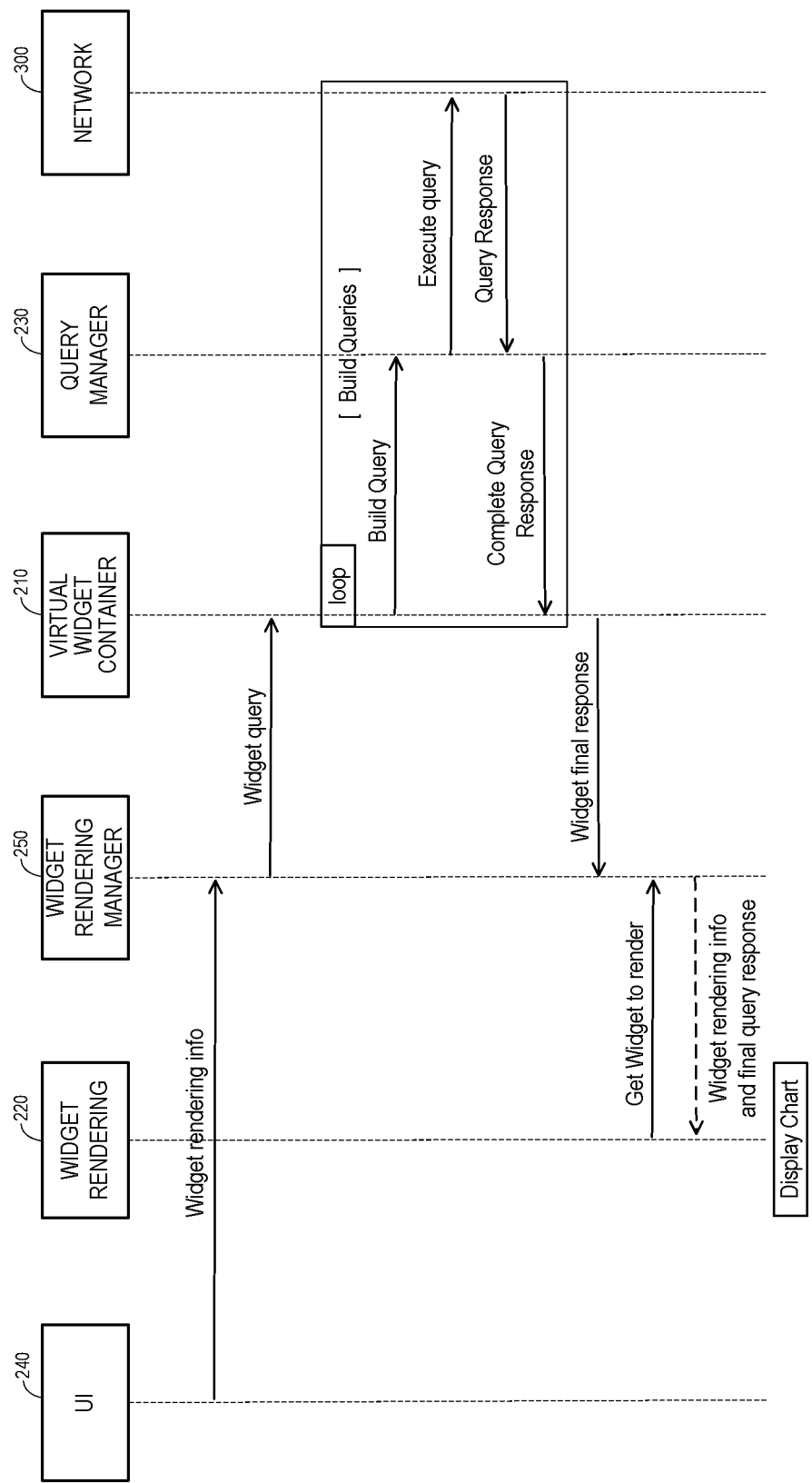
FIG. 3 is a sequence diagram of a process to load and render widgets according to some embodiments.

FIG. 3 is a sequence diagram illustrating operation of the FIG. 2 components according to some embodiments. It will be assumed that, prior to the illustrated sequence, a user has operated a native application of a client device (e.g., mobile device 130) to retrieve a story definition including one or more widget definitions from a backend system (e.g., server 110). For example, UI 240 of the native application requests the story definition from a native query manager (not shown). On a background thread, the native query manager requests the story definition from a backend system, which is then saved to a local data store and sent to UI 240. UI 240 calculates layout areas and widget placement, and provides widget rendering information from the story definition to widget rendering manager 250 in order to initiate widget rendering.

Widget rendering manager 250 forwards the widget information to virtual widget container 210 to retrieve the data of the widget. Code of virtual widget container 210 is executed in a background thread to build queries based on the widget metadata, to ensure that all queries are fired by query manager 230 to network 300 and a full result set is returned from network 300, and to return the full result set to widget rendering manager 250.

Next, widget rendering component 220 asks widget rendering manager 250 for a widget to render. In response, widget rendering manager 250 provides the widget rendering information and the full result set to widget rendering component 220. The request from widget rendering component 220 may occur prior to return of the full result set, in which case widget rendering manager 250 waits to receive the full result set before responding.

Widget rendering component 220 renders and displays the widget as is known in the art. Notably, widget rendering component 220 is not required to build a query and fire it upon a result cache in order to determine whether the data required for rendering is available.

In some embodiments, a snapshot of the rendered widget is acquired and displayed in order to conserve client resources. If the user then selects the displayed image, the rendered widget including its interactive UI controls is displayed. The snapshot may be saved and provided to UI 240 to display to a user immediately in response to future requests for the widget, and while the FIG. 3 executes in the background to refresh the widget.

The FIG. 3 sequence and all other processes mentioned herein may be embodied in computer-executable program code read from one or more of non-transitory computer-readable media, such as a fixed disk drive, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 4:
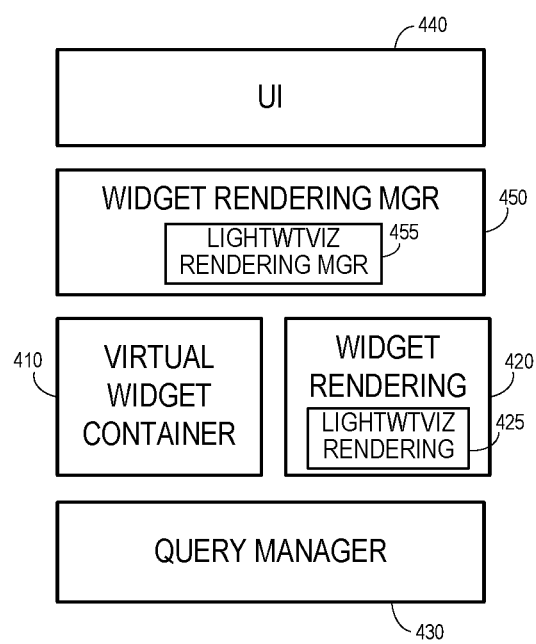
FIG. 4 is a block diagram of a software components of a mobile device according to some embodiments.

FIG. 4 illustrates components of a software stack of a client device for rendering widgets according to some embodiments. Components 410, 420, 430 and 440 may operate similarly to identically-named components 210, 220, 230 and 240 of FIG. 2 to provide a full result set on a background thread. The FIG. 4 software stack also includes lightweight visualization rendering component 425 and lightweight visualization rendering manager 455.

Rendering objects include multiple layers for executing various tasks such as creating a query based on widget metadata, firing a query, receiving query, and widget editing. Since virtual widget container 410 provides a full result set as described above, only rendering functions of widget rendering component 420 are needed to render a widget. Lightweight visualization rendering component 425 therefore includes only the lower most layer of widget rendering component 420. In operation, only lightweight visualization rendering component 425 and none of the other layers is loaded in order to render a widget, saving time as well as memory.

Figure 5:
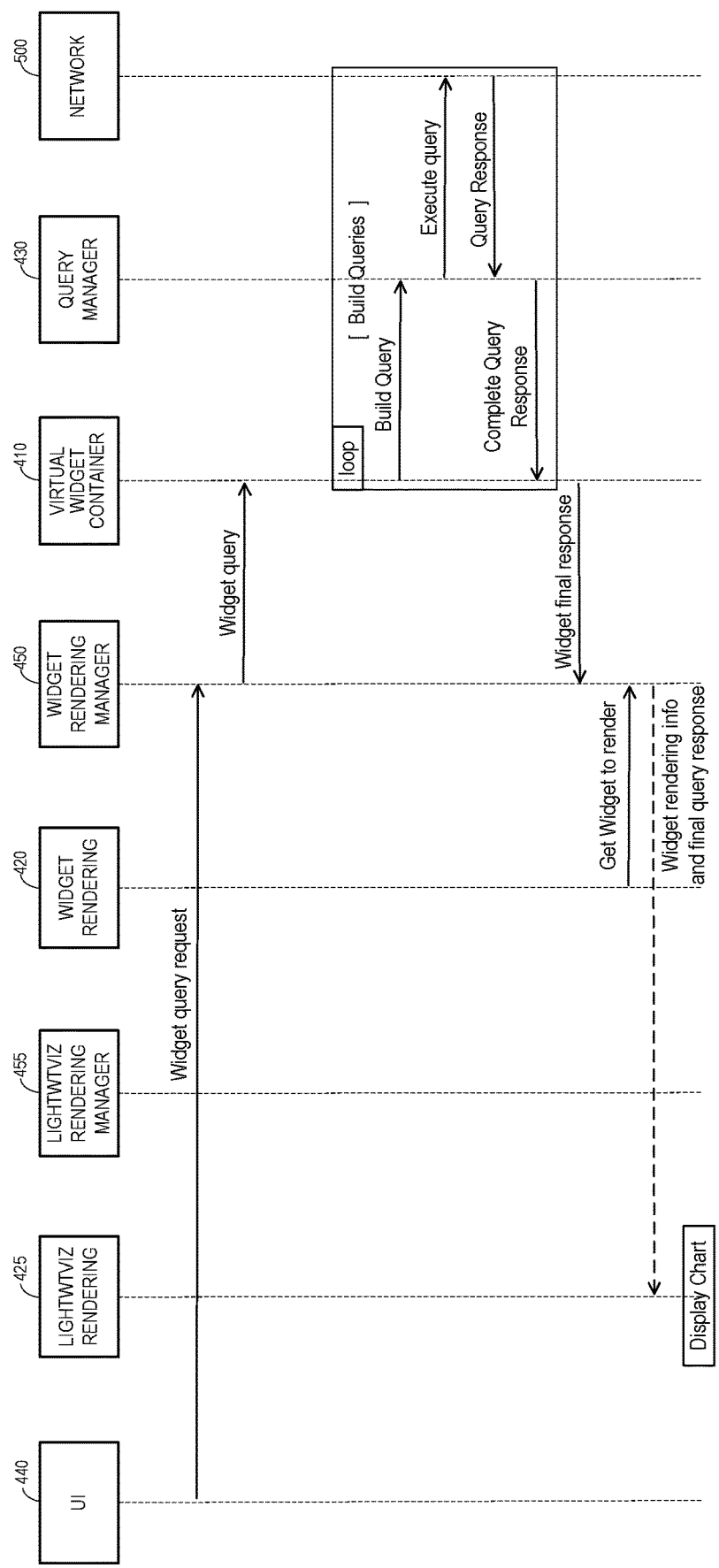
FIG. 5 is a sequence diagram of a process to load and render widgets according to some embodiments.

FIG. 5 is a sequence diagram illustrating operation of the FIG. 4 components according to some embodiments. The FIG. 5 sequence proceeds similarly to the FIG. 3 sequence. However, instead of having widget rendering component 420 render the widget based on rendering information and the full result set received from widget rendering manager 450, the rendering information and full result set are passed via lightweight visualization rendering manager to an entry point of lightweight visualization rendering component 425. Lightweight visualization rendering component 425 consisting of the lowest layers of widget rendering component 420, is then loaded to render the widget.

Figure 6:
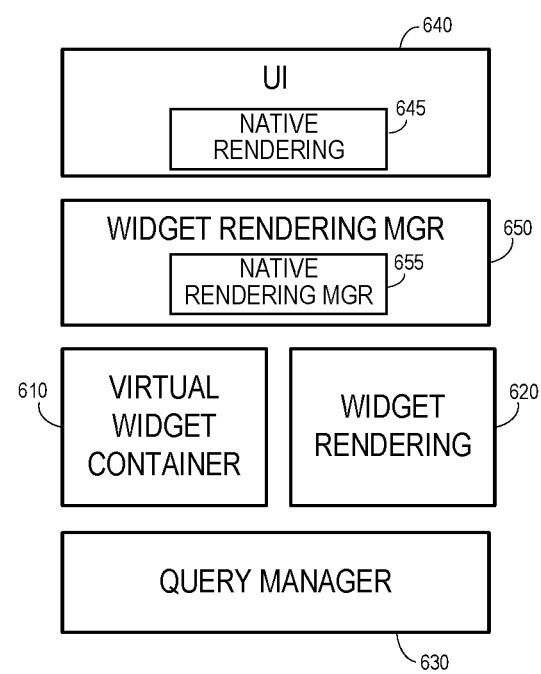
FIG. 6 is a block diagram of a software components of a mobile device according to some embodiments.

FIG. 6 illustrates components of a software stack of a client device for rendering widgets according to some embodiments. Components 610, 620, 630 and 640 may operate similarly to identically-named components 210, 220, 230 and 240 of FIG. 2 to provide a full result set for a widget on a background thread.

The FIG. 6 software stack also includes native rendering component 645 and native rendering manager 655. Native rendering component 645 may consume the widget result set natively in some embodiments. Consequently, a browser-based rendering object such as widget rendering component 620 need not be loaded, thereby saving processing and memory resources.

Figure 7:
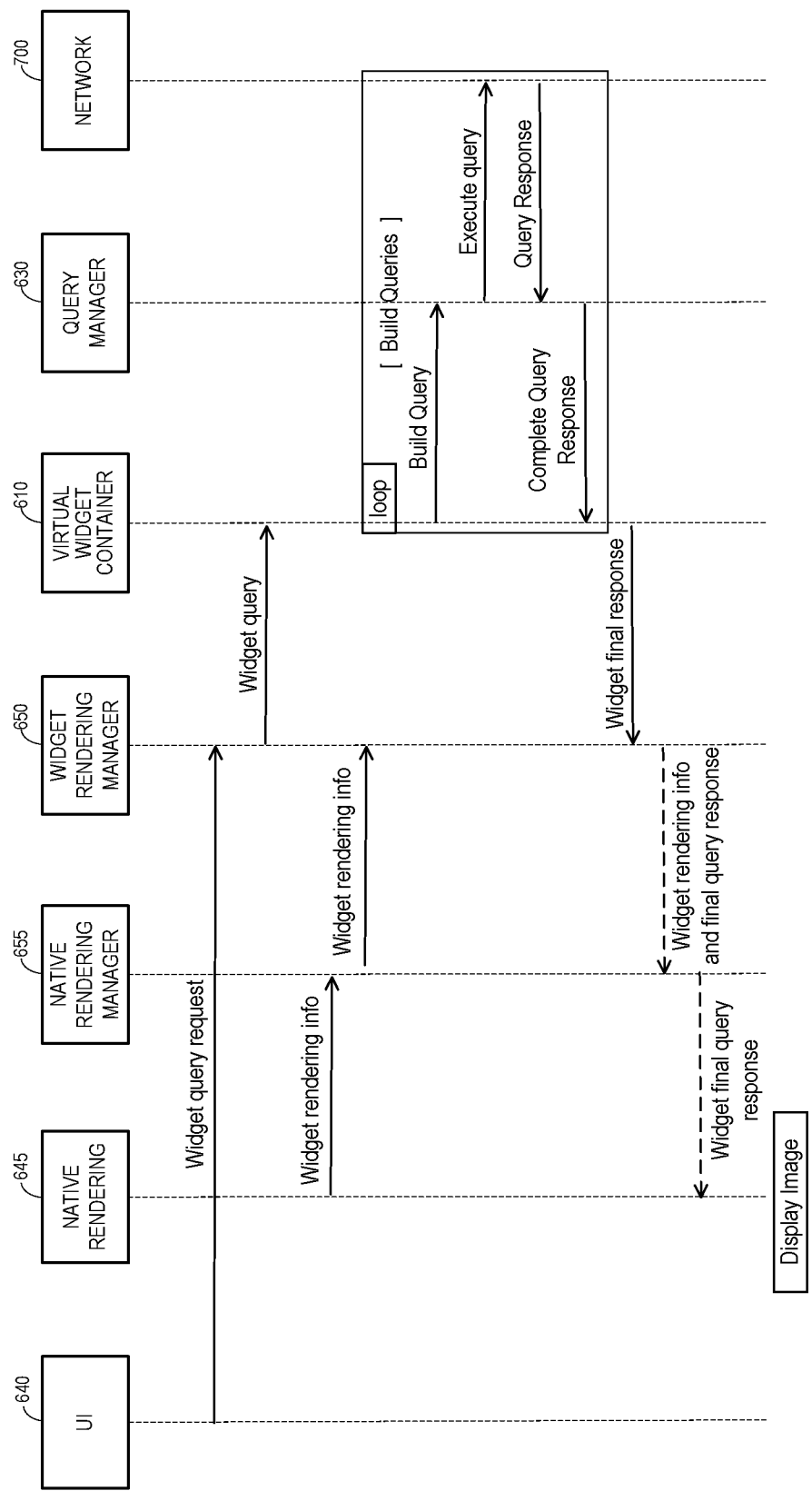
FIG. 7 is a sequence diagram of a process to load and render widgets according to some embodiments.

According to the sequence diagram of FIG. 7, UI 640 asks widget rendering manager 650 to execute queries required for the widget and widget rendering manager 650 forwards the request to virtual widget container 610. Virtual widget container 610 operates in conjunction with query manager 630 as described above to build queries based on the widget metadata and to acquire a full result set from network 700.

Meanwhile, native rendering component 645 transmits rendering information to widget rendering manager 650 via native rendering manager 655. Once the final query response is received from virtual widget container 610, widget rendering manager 650 transmits the rendering information and final response to native rendering component 645 via native rendering manager 655. Native rendering component 645 may then render and display the widget natively.

Although illustrated and described with respect to independent implementations, a lightweight visualization rendering component and a native rendering component as described herein are not mutually exclusive. Accordingly, some embodiments may implement both a lightweight visualization rendering component and a native rendering component.

Figure 8:
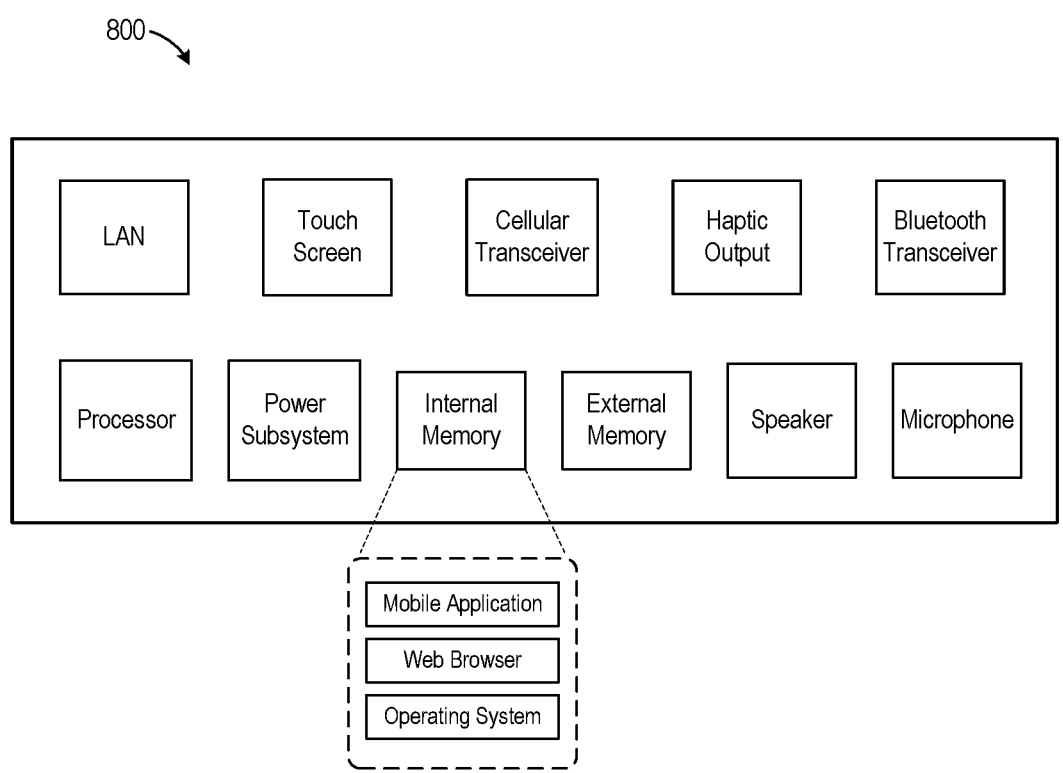
FIG. 8 is a block diagram of a mobile device according to some embodiments.

FIG. 8 is a block diagram of device 800 according to some embodiments. Device 800 may comprise a general-purpose smartphone and may execute program code to perform any of the functions described herein. Device 800 is not limited to a smartphone and may include other unshown elements according to some embodiments.

Device 800 includes a processor and internal memory storing code for execution by the processor. The processor may comprise any combination of microprocessor, controller, gate arrays, processor cores, or other hardware suitable to execute program code. The internal memory may comprise random access memory, cache memory, or other suitable memory, and may comprise volatile, non-volatile, and/or storage-class memory (e.g., non-volatile random access memory). As shown, the internal memory may store an operating system, a web browser and one or more other mobile applications for execution by the processor. One of the mobile applications may comprise program code for providing the software components described herein.

Device 800 also includes a Local Area Network interface which may support wireless communication, for example, with a local router in communication with the Internet. Device 800 may receive story definitions from an external system, and may transmit queries to and receive responses from the external system via the Local Area Network interface. Such data may also be exchanged via the cellular transceiver and bluetooth transceiver of device 800. Device 800 also includes a touch screen to display images and rendered widgets. The touch screen may also receive user input to interactive controls of a rendered widget.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing processor-executable process steps; and
a processor to execute the processor-executable process steps to:
receive a request to render an interactive data visualization including one or more widgets, the widgets being defined by metadata information comprising one or more dimensions, measures and filters;
based on the metadata information defining the widgets, build all queries required by the interactive data visualization on a background thread;
receive a query response associated with each of the queries built on the background thread;
build, on the background thread, a final response result set including all of the query responses to all of the queries required by the interactive data visualization; and
render, on a main thread, the interactive data visualization based on the final response result set.

2. A system according to claim 1, wherein the rendering of the interactive data visualization comprises:
loading only rendering layers of a rendering object having multiple layers; and
rendering the interactive data visualization using only the rendering layers.

3. A system according to claim 1, wherein the rendering of the interactive data visualization comprises:
rendering the interactive data visualization natively.

4. A system according to claim 1, wherein the rendering of the interactive data visualization on the main thread does not comprise building a query associated with the interactive data visualization.

5. A system according to claim 1, wherein the processor further executes the processor-executable process steps to:
receive a user command to retrieve a story;
request the story from a remote server in response to the user command; and
in response to the request, receive a story definition comprising the metadata information of the one or more widgets of the interactive data visualization and second metadata information of a second one or more widgets of a second interactive data visualization.

6. A system according to claim 1, wherein the reception of the request, the building of the queries, and the building of the final response are executed by an environment capable of execution on the background thread.

7. A system according to claim 6, wherein the environment does not include any user interface dependencies.

8. A computer-implemented method comprising:
receiving a request to render an interactive data visualization including one or more widgets, the widgets being defined by metadata information comprising one or more dimensions, measures and filters;

based on the metadata information defining the widgets, building all queries required by the interactive data visualization on a background thread;

receiving a query response associated with each of the built on the background thread;

building, on the background thread, a final response result set including all of the received query responses to all of the queries required by the interactive data visualization; and rendering, on a main thread, the interactive data visualization based on the final response result set.

9. A computer-implemented method according to claim 8, wherein the rendering of the interactive data visualization comprises:

loading only rendering layers of a rendering object having multiple layers; and rendering the interactive data visualization using only the loaded rendering layers.

10. A computer-implemented method according to claim 8, wherein the rendering of the interactive data visualization comprises:

rendering the interactive data visualization natively.

11. A computer-implemented method according to claim 8, wherein the rendering of the interactive data visualization on the main thread does not comprise building a query associated with the interactive data visualization.

12. A computer-implemented method according to claim 8, further comprising:

receiving a user command to retrieve a story;

requesting the story from a remote server in response to the user command; and in response to the request, receiving a story definition comprising metadata information of the one or more widgets of the interactive data visualization and second metadata information of a second one or more widgets of a second interactive data visualization.

13. A computer-implemented method according to claim 8, wherein the reception of the request, the building of the queries, and the building of the final response are executed by an environment capable of execution on the background thread.

14. A computer-implemented method according to claim 13, wherein the environment does not include any user interface dependencies.

15. A system comprising:

executable code of a virtual widget environment, the virtual widget environment to:

receive a request to render an interactive data visualization including one or more widgets, the widgets being defined by metadata information comprising one or more dimensions, measures and filters;

build all queries required by the interactive data visualization on a background thread based on the metadata information defining the widgets;

receive a query response associated with each of the queries built on the background thread; and build, on the background thread, a final response result set including all of the received query responses to all of the queries required by the interactive data visualization; and executable code of a widget rendering component, the widget rendering component to:

render, on a main thread, the interactive data visualization based on the final response result set.

16. A system according to claim 15, wherein the rendering of the interactive data visualization comprises:

loading only rendering layers of a rendering object having multiple layers; and rendering the interactive data visualization using only the loaded rendering layers.

17. A system according to claim 15, wherein the rendering of the interactive data visualization on the main thread does not comprise building a query associated with the interactive data visualization.

18. A system according to claim 15, further comprising:

a user interface component to:

receive a user command to retrieve a story;

request the story from a remote server in response to the user command; and in response to the request, receive a story definition comprising metadata information of the one or more widgets of the interactive data visualization and second metadata information of a second one or more widgets of a second interactive data visualization.

19. A system according to claim 15, wherein the virtual widget environment does not include any user interface dependencies.

* * * * *